United States Patent [19]

Chandler

[11] Patent Number: 5,611,616
[45] Date of Patent: Mar. 18, 1997

[54] ELECTRICAL CONTROLS ENCLOSURE

[75] Inventor: William D. Chandler, Ashland, Ohio

[73] Assignee: Chandler Systems, Inc., Ashland, Ohio

[21] Appl. No.: 379,713

[22] Filed: Jan. 27, 1995

[51] Int. Cl.$^6$ .................................................. F21V 33/00
[52] U.S. Cl. ..................... 362/154; 362/253; 220/4.02; 116/202; 174/37
[58] Field of Search ................................ 362/154, 310, 362/267, 253; 220/4.02; 116/202; 174/37, 38; 361/730, 736, 752

[56] References Cited

U.S. PATENT DOCUMENTS

| | | | |
|---|---|---|---|
| 4,519,657 | 5/1985 | Jensen | 174/38 |
| 5,117,067 | 5/1992 | Jaycox | 174/38 |
| 5,184,279 | 2/1993 | Horn | 174/38 |
| 5,384,427 | 1/1995 | Volk et al. | 174/37 |
| 5,399,811 | 3/1995 | Fremgen et al. | 174/38 |
| 5,401,902 | 3/1995 | Middlebrook et al. | 174/38 |
| 5,404,266 | 4/1995 | Orchard et al. | 174/38 |

OTHER PUBLICATIONS

Ohio Electric Control "Selectrol Signature" Control Panel, Model No. Q23–SD4, Ohio Electric Control, Inc., Ashland, Ohio, Mar. 1994.

Primary Examiner—Ira S. Lazarus
Assistant Examiner—Alfred Basichas
Attorney, Agent, or Firm—Calfee Halter & Griswold

[57] ABSTRACT

An improved electrical controls enclosure is provided having a modular assembly which is generally tubular in shape, having a generally uniform cross-sectional area throughout its longitudinal axis. The modular assembly comprises (i) a base mounting flange or other fitting as needed, (ii) a pedestal support, (iii) a control panel assembly covered by a control panel assembly shroud, (iv) a reducer coupling for connecting the pedestal support to the control panel assembly shroud, and (v) a cover cap resting atop the control panel assembly shroud. An air and watertight seal is provided between the interior of the pedestal support and the interior of the control panel assembly shroud. The control panel assembly contained within the shroud is seated within a shoulder in the reducer coupling, and is universally rotatable 360 degrees with respect thereto.

14 Claims, 3 Drawing Sheets

5,611,616

ELECTRICAL CONTROLS ENCLOSURE

FIELD OF THE INVENTION

The present invention relates generally to enclosures and more particularly to an electrical controls enclosure which is easily installed and serviced and which is designed to resist damage caused by factors of the environment and vandalism.

BACKGROUND OF THE INVENTION

Enclosures for electrical and electronics devices are well known. These enclosures provide protection for electrical/electronic components contained therein. Such enclosures have been designed for interior uses within buildings and for external uses outside buildings.

A known type of enclosure 10 is shown in FIG. 1, which is exemplary of enclosures sold by a variety of manufacturers including Ohio Electrical Control, Inc. of Ashland, Ohio. FIGS. 2 and 3 show the components of the enclosure 10 of FIG. 1. The enclosure 10 comprises an upper portion 12 containing a control panel 14 to which are attached electrical and/or electronic components (see FIG. 3), and a pedestal or base portion 16 which contains wiring 18 which is run to the internal components (see FIG. 2).

A hinged interior control panel door 20 and a hinged exterior enclosure door 22 are provided for the upper portion 12. An annunciator 24 may also be provided which provides an audible or visible alarm should, for example, one or more of the electrical/electronic components in the enclosure signal an alarm condition. An access opening 26 is provided in the pedestal 16 which provides access to the wiring 18. The access opening facilitates installation of the enclosure 10 by allowing an installer to manually feed the wiring 18 through the floor of the upper portion 12 of the enclosure so that it may be connected to appropriate locations on the control panel 14.

The prior art enclosure of FIGS. 1-3, however, suffers from several drawbacks. These problems are presented regardless of whether the upper portion 12 is mounted on the pedestal 16 or on a building structural member. First, installation of the enclosure 10 may be made difficult because the position of the control panel 14 is fixed with respect to the upper portion 12 in which it is contained. Therefore, any additional wiring conduit which is run to the upper portion 12, other than through the pedestal 16, might be attached to the upper portion at locations which make wiring connections to the control panel 14 difficult. The fact that the upper portion 12 may be rotated upon the longitudinal axis of the pedestal 16 to better position the control panel 14 with respect to the incoming wiring conduit does not solve this problem because (i) often internal building equipment or structural members will preclude rotational movement of the upper portion 12 with respect to the base, and (ii) even if rotation is not so impeded, a convenient installation position may be aesthetically undesirable. Thus, the design of the prior art enclosure 10, in which the position of the control panel 14 is fixed with respect to the enclosure in which is contained, presents a potential installation problem.

One particular installation of the prior art enclosure presents an additional problem which may cause damage to the control panel 14 over the course of time. In installations wherein the enclosure 10 contains controls for underground tanks for liquids, such as pump switches and liquid level alarms, the wiring from the underground level indicators or pumps is run from the tank, through the pedestal 16, and into the upper portion 12 of the enclosure. Although the enclosure door 22 may provide a watertight seal for the upper portion 12 of the enclosure, such a seal is not provided at the connection between the upper portion 12 and the pedestal 16. If the wiring 18 is run from an underground tank, then, corrosive gases from the tank will migrate upward through the pedestal 16 and into the upper portion 12 of the enclosure.

Service of the prior art enclosure 10 also provides a potential problem. Because the control panel 14 is covered by both the hinged interior control panel door 20 and the hinged exterior enclosure door 22, these doors must remain open when service is being performed on the control panel. If the enclosure 12, with or without a pedestal 16, is not mounted horizontally level, these doors may tend to resist staying in one place while open, possibly hampering the efforts of service personnel.

If the prior art enclosure 10 is installed outside, further drawbacks become evident. The hinged doors 20 and 22 may catch the wind once opened and move so as to provide a hindrance to service personnel. Additionally, in exterior installations, the large cross-sectional area of the upper portion 12 of the enclosure 10, as compared to the pedestal 16, is subject to loading in windy conditions in exterior installations, which can cause excessive strain to the enclosure at either or both ends of the pedestal 16. Moreover, the large cross-sectional area provides an inviting target for vandalism.

Accordingly it is an object of the present to provide an improved electrical enclosure which is generally tubular in shape which provides (i) lessened wind resistance, (ii) a less inviting target for vandalism, (iii) a more aesthetic appearance, (iv) easier installation and serviceability, and (v) a better internal gas and watertight seal than conventional electrical enclosures.

SUMMARY OF THE INVENTION

An improved electrical controls enclosure is provided having a modular assembly which is generally tubular in shape. The modular assembly comprises (i) a base mounting flange, (ii) a pedestal support, (iii) a control panel assembly covered by a control panel assembly shroud, (iv) a straight or reducer coupling for connecting the pedestal support to the control panel assembly shroud, and (v) a cover cap resting atop the control panel assembly shroud. Gasket seals provide water tight connections between the control panel assembly shroud and both the reducer coupling and the cover cap. Hasps or latches secure the shroud to both the reducer coupling and the cover cap.

Because the cross section of the enclosure is generally uniform throughout its longitudinal axis, the enclosure is generally less wind resistant and provides a less inviting target for vandals. A "generally uniform" cross sectional area as defined herein shall mean a cross sectional area the largest portion of which differs from the smallest portion of which by less than fifty percent. "Generally similar" cross sectional areas as defined herein shall mean cross sectional areas which do not differ from each other by more than fifty percent. Also, because the shroud, instead of a door, covers the control panel assembly, servicing the enclosure is made easier.

An annular seal ring rests atop the pedestal support. Above the seal ring lies an inner gasket upon which is seated a seal plate, having threaded holes therein. The annular seal ring, the inner gasket and the seal plate all lie within the confines of the reducer coupling. The threaded holes in the seal plate accommodate cord grips which allow power and control wiring to pass therethrough when loosened within the threads. When tightened, the cord grips grip the wiring, providing an air and watertight seal between the interior of the pedestal support and the interior of the control panel assembly shroud.

The control panel assembly contained within the shroud is seated within a shoulder in the reducer coupling. The control assembly seated in this position may be universally rotated 360 degrees with respect to the reducer coupling. In this manner, the enclosure provides an unlimited number of positions in which the control assembly may be positioned with respect to the lower section of the enclosure, thereby facilitating both installation and service of the controls contained within the enclosure.

DETAILED DESCRIPTION OF THE PREFERRED EMBODIMENT

Figure 1:
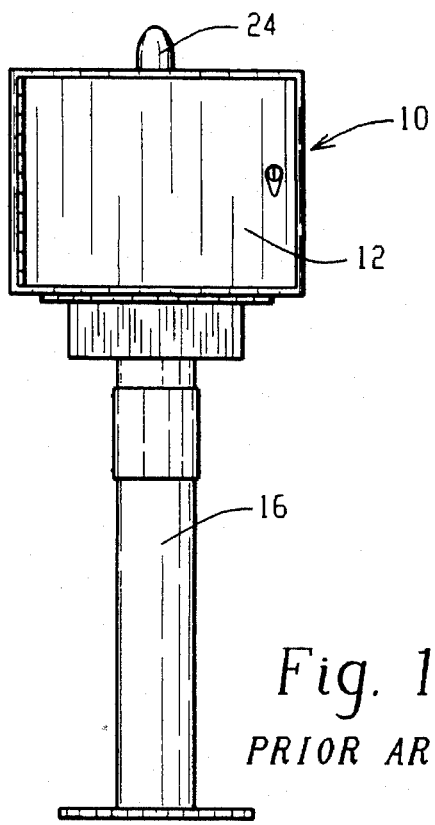
FIG. 1 shows a prior art electrical enclosure.
Figure 2:
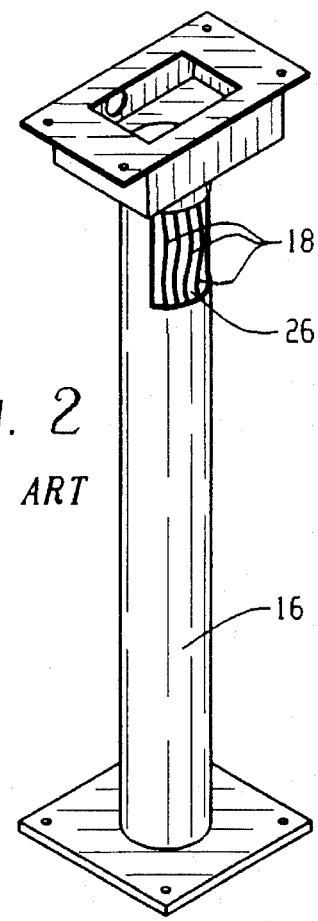
FIGS. 2 and 3 show lower and upper components of the prior art electrical enclosure of FIG. 1, respectively.
Figure 3:
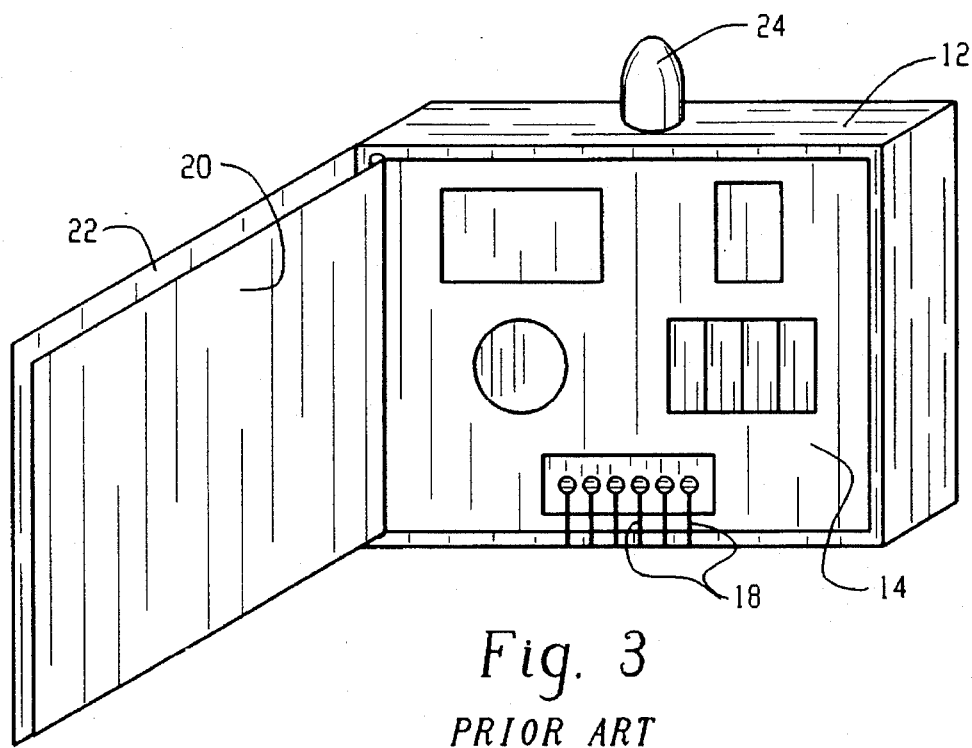

FIG. 1 shows a perspective view of an enclosure 40 constructed according to the principles of the present invention. The enclosure 40 is generally tubular along a longitudinal axis. As used herein, "tubular" shall mean more than generally cylindrical to include closed-channel configuration enclosures having generally square, or any other polygonally shaped, cross-sections. For example, the generally cylindrical enclosure 40 shown in FIG. 4 may assume the shape of a parallelepiped, or square-post, design.

The enclosure 40 comprises a base mounting flange 42; a wiring conduit or pedestal support 44; a control panel assembly shroud 46; a reducer coupling 48 for connecting the pedestal support 44 to the control panel assembly shroud; and a cover cap 50 resting atop the control panel assembly shroud. A lower gasket 52 seals the connection between the control panel assembly shroud 46 and the reducer coupling 48, and an upper gasket 54 seals the connection between the reducer coupling 48 and the cover cap 50. The seals 52, 54 provide watertight protection for the interior of the control panel assembly shroud 46.

An optional annunciator 56, such as a light bulb and lens combination, may be provided for the cover cap 50. An L-shaped conduit 58 is provided on the reducer coupling 48 through which field wiring may be run to the interior of the control panel assembly shroud 46. Wiring is also run to the interior of the control panel assembly shroud 46, through the pedestal support 44, from below the base mounting flange 42, as further described below.

Figure 4:
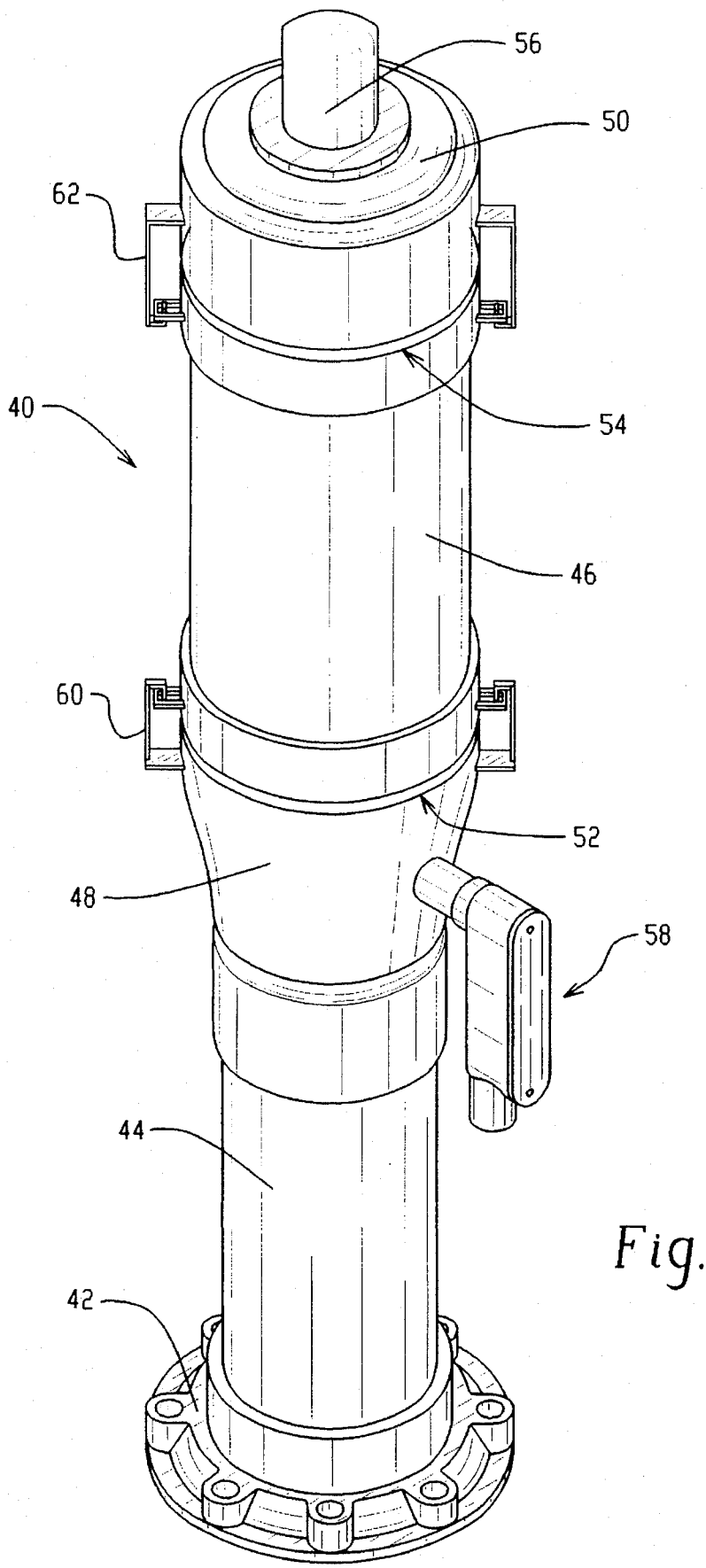
FIG. 4 is a perspective view of a generally tubular electrical enclosure constructed according to the principles of the present invention.

The enclosure 40 as shown in FIG. 4 provides a modular assembly which comprises (i) a lower section including the base mounting flange 42, the pedestal support 44, and the reducer coupling 48; (ii) a middle section including control panel assembly shroud 46 and a control panel assembly 49 contained therein (see FIG. 5); and (iii) a top section including the cover cap 50. Lower hasps or latches 60 secure the lower and middle sections together, with lower gasket 52 sandwiched therebetween, and upper hasps or latches 62 secure the middle and upper sections together, with upper gasket 54 sandwiched therebetween.

Because the cross section of the enclosure 40 is generally uniform throughout its longitudinal axis, the enclosure is generally less wind resistant and provides a less inviting target for vandals. Also, because the shroud 46, instead of a door, covers control panel assembly 49, servicing the enclosure 40 is made easier.

Figure 5:
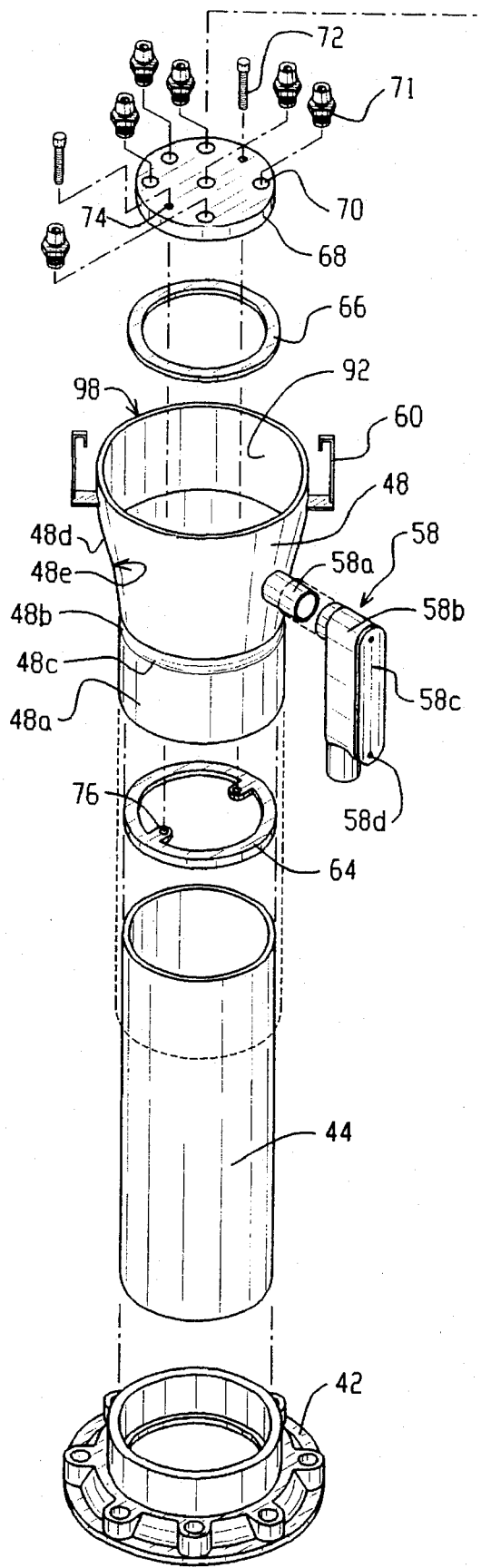
FIG. 5 is an exploded perspective view of the tubular electrical enclosure of FIG. 4, illustrating both interior and exterior components of the enclosure and the manner of assembly thereof.

A more detailed view of the enclosure 10 is provided in FIG. 5, which is an exploded view the enclosure shown in FIG. 4, illustrating the manner of assembly of the enclosure. Working from the bottom to the top of the enclosure 10, the base mounting flange 42 is provided with a plurality of mounting holes to which the enclosure 10 may be bolted to, for example, a concrete block or floor. The base mounting flange 42 is fixedly attached to the pedestal support 44. In the preferred embodiment, the external components of the enclosure (including the base mounting flange 42 and the pedestal support 44) are made of polyvinyl chloride (PVC) tubing, which may be secured together by glue or by socket welding.

An annular seal ring 64, having an outer diameter equal to that of the pedestal support 44, rests atop the pedestal support. A lower portion 48a of the reducer coupling 48, having an inner diameter slightly greater than the outer diameter of the seal ring 64 and the pedestal support 44, is slipped over the seal ring and an upper portion of the pedestal support until the seal ring meets a crimped middle section 48b of the reducer coupling, defined at its lower end by shoulder 48c. With the seal ring 64 abutting the shoulder 48c, the pedestal support 44 and the reducer coupling 48 are socket welded together.

The conduit 58 extends from the middle portion 48b of the reducer coupling. The conduit comprises a nipple 58a, a lateral bend section 58b, and a cover 58c removably attached to the lateral bend section by screws 58d. Sitting within the middle portion 48b of the reducer coupling on top of the seal ring 64 is an inner gasket 66. On top of the inner gasket is a seal plate 68, having holes 70 drilled therein and threaded. The seal plate 68 in the preferred embodiment is made of PVC bar stock. The outer diameter of the seal plate is only slightly less than the inner diameter of the crimped middle section 48b of the reducer coupling 48. The threaded holes 70 accommodate cord grips 71 which allow power and control wiring to pass therethrough when loosened within the threads. Suitable cord grips may be such as those manufactured by Hubbel Manufacturing, of Bridgeport, Conn., although the use of other similar type cord grips are contemplated. When tightened, however, the cord grips 71 grip the wiring, providing an air and watertight seal.

The seal plate 68 is secured to the seal ring 64, with the inner gasket 66 sandwiched therebetween, by means of threaded screws 72 which pass through corresponding holes 74, 76 in the seal plate and seal ring, respectively. Accordingly, when the seal plate 68 is secured to seal ring 64, and the cord grips 71 are tightened about wiring passing therethrough, the area above the seal plate 68 provides an air and watertight seal isolating the area above the seal plate from that below. Any gas or moisture which might eventually corrode electrical or electronic components on the control panel assembly 49 contained within the shroud, which might otherwise migrate from the conduit 58 or the pedestal support 44 absent this air and water tight seal, is prevented from passing through the seal plate 66.

The crimped middle section of the reducer coupling 48 is separated by a wider diameter upper section 48*d* of the reducer coupling 48*e* which extends around the inner circumference of the reducer coupling. The control panel assembly 49 contained within the shroud 46 is seated within this shoulder 48*e*. As shown in the right hand half of FIG. 5, the control panel assembly 49 comprises (i) a component backplate 80 to which electrical/electronic components (not shown) may be attached, (ii) a control console top plate 82 to which control components may be attached and which is secured to the top of the component backplate 80, and (iii) an annular control panel assembly base 84 secured to the bottom the component backplate 80. The top plate 82 is attached to the backplate 80 by means of screws 86, and the backplate is attached to the base 84, to complete assembly of the control panel assembly 49. The electronic controls attached to the component backplate 80 may include pumps, alarm relays, and other such control or indicator devices for underground liquid holding facilities. Of course, other electrical or electronic components may be attached to the backplate, and other types of installations are contemplated by the present invention.

The console top plate 82 may be wired to provide easily accessible components, such as switches or fault indicators. Although not shown in FIG. 5, if the optional annunciator 56 is provided with the enclosure 10, the light bulb is mounted to the console top plate 82, and the lens is incorporated into the cover cap 50. The backplate 80 and the control console top plate 82 are formed of a suitably rigid and corrosion resistant material, such as stainless steel.

When fully assembled, the control assembly 49 may be dropped into the top of the reducer coupling until the annular control panel assembly base 84 abuts shoulder 48*e*. When seated in this position, the control assembly may be universally rotated 360 degrees with respect to the reducer coupling. In this manner, the enclosure 10 provides an unlimited number of positions in which the control assembly 49 may be positioned with respect to the lower section of the enclosure.

Accordingly, when installing the enclosure, the control assembly may be easily positioned by the installer to facilitate easy connection of to the wiring exiting the conduit 58 or the seal plate 66. At the same time, the control assembly may be positioned to facilitate future service of electrical/electronic components attached to the component backplate 80. Once positioned, the control assembly 49 may be secured to the reducer coupling by a plurality of thumbscrews 90 which pass through the control panel assembly base 84 until they come into contact with an inner surface 92 of the upper section 48*d* of the reducer coupling 48.

The control panel assembly 49 is isolated from the environment by the shroud 46. In the preferred embodiment, the shroud, like the lower section of the enclosure, is made of PVC. The outer diameter of the shroud is just slightly less than the inner diameter of the upper section 48*d* of the reducer coupling 48. The shroud 46 is slipped over the control panel assembly 49 until it rests upon the control panel assembly base 84. The shroud is provided with a lower collar 94 having a shoulder 96 which sandwiches the lower gasket 52 between it and an upper rim 98 of the reducer coupling 48, when in this position. The lower hasps or latches 60 secure the shroud 46 to the reducer coupling 48, thereby compressing the lower gasket 52 to seal the reducer coupling-shroud connection.

The cover cap 50 has in inner diameter slightly greater than the outer diameter of the shroud and slips over the top of the shroud. The shroud 46 also has an upper collar 100 having a shoulder 102 which sandwiches the upper gasket 54 between it and a lower rim 104 of cover cap 50, when in this position. The upper hasps or latches 62 secure the cap 50 to the shroud 46, thereby compressing the upper gasket 54 to seal the cover cap-shroud connection.

If the cover is provided with the annunciator 56, the lens may be attached to the top of the cover cap 50 by means of screws and a watertight gasket (not shown). Alternatively, because the cover cap 50 is also made of PVC or other type of plastic material, the lens may be formed integrally with the cap. In yet another embodiment, the entire cap itself may be made of a translucent material, such as a polycarbonate, to act as a lens. In such an embodiment, the cap may be tinted a highly visible color, such as amber or red.

The design of the enclosure as set forth in the foregoing description permits easy serviceability of the enclosure 40. By merely removing the cover cap 50, the control console top plate is made accessible, for example, to reset a console switch or replace the annunciator bulb. If access to the control panel assembly 49 is desired, the shroud 46 is lifted off of the reducer coupling 52, exposing the electrical/electronic components attached to the component backplate 80. The entire panel assembly 49 may be removed by disconnecting wiring extending from the seal plate 68 and merely loosening the thumbscrews 90 which secure the assembly to the control panel assembly base 84.

Accordingly, the preferred embodiment of an electrical enclosure has been described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter claimed.

I claim:

1. An electrical enclosure, comprising:

(i) a component enclosure for containing electrical components;

(ii) a wiring conduit connected to said component enclosure; and (ii) a sealing device for providing an air and watertight seal between an interior of said component enclosure and an interior of said wiring conduit, said sealing device comprising (a) a seal plate having at least one hole therein for accommodating at least one wire, and (b) at least one gripping device for securing said at least one wire within said at least one hole, wherein said at least one hole is provided with threads, and said at least one gripping device is rotated within said threads in opposite directions, respectively, to tighten and loosen said at least one wire within said at least one hole, and wherein said component enclosure and said wiring conduit are made of a non-metallic tubing material.

2. The electrical enclosure of claim 1, wherein said seal plate is made of a non-metallic material.

3. A generally tubular electrical enclosure having a longitudinal axis and a generally uniform cross sectional area when measured along substantially the entire length of said axis, comprising:

(i) a generally tubular component enclosure for containing an electrical component assembly, said generally tubular component enclosure made of a non-metallic tubing material;

(ii) a generally tubular wiring conduit connected to said component enclosure, said wiring conduit having a generally similar cross sectional area as that of said component enclosure along said longitudinal axis, said generally tubular wiring conduit made of a non-metallic tubing material; and (iii) a coupling portion for connecting said component enclosure to said wiring conduit.

4. The electrical enclosure of claim 3, further comprising a generally tubular cover cap for said generally tubular component enclosure.

5. The electrical enclosure of claim 4, further comprising a first sealing gasket intermediate said cover cap and said component enclosure and a second sealing gasket intermediate said component enclosure and said wiring conduit.

6. The electrical enclosure of claim 4, wherein said cover cap includes a lens for an annunciator illumination device located on a top portion thereof.

7. The electrical enclosure of claim 6, wherein said lens is formed integrally with said cover cap.

8. The electrical enclosure of claim 7, wherein said cover cap and said integrally formed lens are made of a polycarbonate material.

9. An electrical enclosure comprising:

(i) a pedestal portion having a cavity through which electrical wiring may be run, said pedestal portion being generally tubular in shape and made of a non-metallic material;

(ii) a control panel assembly supported by said pedestal portion, said panel assembly providing a surface to which electrical components are attachable, said control panel assembly including a base at least a portion of which is contained within said pedestal portion and which is rotatably positionable with respect to said pedestal portion in more than two positions; and (iii) a component enclosure for surrounding at least a portion of said control panel assembly, said base being positionable independently of the position of both said pedestal portion and said component enclosure, said component enclosure being generally tubular in shape and made of a non-metallic material.

10. The electrical enclosure of claim 9, wherein said pedestal portion provides a recess having the shape of a polygon, and said control panel assembly base has a correspondingly similar configuration, at least a portion of said base fitting within at least a portion of said recess, said more than two positions in which said control panel assembly is positionable with respect to said pedestal portion equal to a number of sides of said polygon.

11. The electrical enclosure of claim 9, wherein said pedestal portion provides a generally cylindrical recess, and said control panel assembly is provided with an annular-shaped base, at least a portion of said base fitting within at least a portion of said recess, said control panel assembly universally rotatable with respect to said pedestal portion when said at least a portion of said base is positioned within said at least a portion of said recess.

12. The electrical enclosure of claim 9, wherein the position of said control panel assembly with respect to said pedestal portion is fixed by means of thumbscrews.

13. The electrical enclosure of claim 12, wherein said control panel assembly further comprises a component backplate to which electrical/electronic components may be attached, and a control console top plate to which control components may be attached.

14. The electrical enclosure of claim 13, wherein an annunciator device is mounted to said console top plate, and a lens is provided in a top portion of a cover cap of said component enclosure through which said annunciator device may be viewed.

* * * * *